Patented Aug. 4, 1942

2,291,700

UNITED STATES PATENT OFFICE 2,291,700

RUBBER BONDED TO REGENERATED CELLULOSE

Henry Dreyfus, London, England, assignor to Celanese Corporation of America, a corporation of Delaware No Drawing. Application October 26, 1939, Serial No. 301,401. In Great Britain November 8, 1938

9 Claims. (Cl. 154—40)

This invention relates to a treatment of regenerated cellulosic materials to render them more readily unitable to rubber.

Difficulty is encountered in uniting regenerated cellulosic materials, e. g. films, foils, yarns and the like of regenerated cellulose to rubber. I have now found that this difficulty can be overcome by providing as an adhesive or intermediate layer between the rubber and the regenerated cellulosic material a composition containing a dispersion of rubber in intimate admixture with an unstable compound of cellulose, e. g. an alkaline cellulose xanthogenate, the rubber being coagulated and the compound of cellulose decomposed, for instance, by heat or an acid bath.

The invention may be illustrated in relation to the production of cord tyres having cords of regenerated cellulose of high tenacity. A composition is made containing well-ripened viscose dispersed with ammonia stabilised rubber latex in the presence of a small quantity of casein. Other protective colloids or dispersing agents adapted to function in an alkaline medium may be present, e. g. soaps and especially soaps of non-metallic bases such as the alkylolamines. The cord material, which is composed of yarns of regenerated cellulose of high tenacity, made, for example, by the complete saponification of cellulose acetate yarns which have been stretched considerably under the influence of an assisting substance, is impregnated with the composition. The impregnated material is then either heated for such a time and at such a temperature as to decompose the viscose and dry the material, preferably without substantially vulcanising the rubber, or subjected to an acid bath, to coagulate the rubber and regenerate the cellulose from the viscose.

After a washing step directed to leave the coated material with a neutral or very slightly alkaline reaction, the material is dried. The dried cord material is now superposed upon the compounded rubber stock which is to form the body of the tyre and the vulcanisation is effected in the usual way.

Decomposition of the viscose and coagulation of the rubber latex can be effected by subjecting the impregnated regenerated cellulosic material either to dry heat or to the action of live steam. To avoid damage to the rubber articles to which the regenerated cellulosic material is to be attached from the evolution of gases during decomposition of the viscose, the decomposition must generally be effected before application of the impregnated material to the rubber stock.

Where, however, the nature of the product is such that this danger does not arise, the impregnated material may be applied to the rubber stock before decomposition of the viscose and decomposition effected during vulcanisation. When this method is adopted vulcanising ingredients, for example, sulphur, zinc oxide and vulcanisation accelerators may be included in the composition in proportions necessary to vulcanise the rubber contained in the latex at the same time as the rubber stock.

As indicated above, an alternative method of decomposing the viscose in the composition and simultaneously coagulating the latex is to employ an acid bath instead of heat. The acid should, of course, not be so concentrated as to weaken the regenerated cellulosic material. After decomposition of the viscose and coagulation of the latex in this way, the impregnated material should be treated in a slightly alkaline bath, for example, a bath containing sodium bicarbonate or ammonium carbonate to remove acidity which may otherwise have a prejudicial effect on the life of the rubber.

The following examples illustrate the invention:

Example 1

A viscose containing 7-8% of cellulose and 6-7% of caustic soda is ripened to a salt number between 4 and 5 (i. e. until the viscose is coagulable to an extent sufficient to allow it to be drawn into a thread, by an aqueous 4-5% solution of sodium chloride).

Into 100 parts by weight of ripened viscose is stirred 15-20% parts by weight of 60% ammonia-stabilised rubber latex containing a small quantity of casein.

Tyre cords of high tenacity regenerated cellulose, made by doubling and then cabling yarns formed by the complete saponification of yarns of cellulose acetate stretched to such an extent in steam or hot water as to impart to them a tenacity of 3-4 grams per denier, are drawn first through a bath containing the mixture of viscose and rubber latex, then through squeeze rollers to remove excess of the coating bath and then through an aqueous bath containing 7-10% of sulfuric acid and 30-40% of sodium bisulphate. In this bath the rubber is coagulated and the cellulose regenerated from the viscose. The coated materials are washed first with a dilute solution of sodium bicarbonate and then with water and dried in air at a temperature between 50 and 60° C.

The coated cords are laid between sheets of compounded unvulcanised rubber, embedded in the rubber by pressure and vulcanisation is effected under pressure.

Example 2

The process is carried out as in Example 1 save that the viscose is ripened to a salt number between 3 and 4 and coagulation of the rubber and regeneration of the cellulose are effected by heating the coated cords at a temperature between 100 and 110° C. in air and the coated materials are washed first with dilute acetic acid, then with dilute sodium bicarbonate and finally with water, after which they are dried.

Example 3

A solution of sodium viscose is prepared as follows:

100 parts by weight of cotton is immersed in 15% aqueous caustic soda solution for two hours at room temperature. The alkali cellulose so produced is pressed until it holds approximately its own weight of liquor and allowed to stand for 24 hours. 40% of carbon disulphide calculated on the weight of dry cotton is added and the mixture agitated for three hours. The excess of carbon disulphide is removed with a current of air and the viscose dissolved in 2% aqueous caustic soda solution.

The viscose solution is mixed with ammonia-stabilised rubber latex so as to form a mixture containing 5–10% of cellulose and about 30% of rubber.

Tyre cords of the kind employed in Example 1 are impregnated with this mixture, and after removal of excess by passage through squeeze rollers are dried at 60–70° C. for half-an-hour. This process is repeated twice, three impregnations being given altogether. The impregnated cords are finally heated at 120° C. for twenty minutes. They are then washed, dried and further treated as described in Example 1.

The invention has been described with particular reference to the production of cord tyres containing cords of regenerated cellulose. The invention is capable, however, of many other useful applications. It may be used, for example, to secure firm adhesion between sheets or foils of regenerated cellulosic material and sheets of rubber. It may be used to prepare textile fabrics of regenerated cellulose for impregnation with rubber as, for example, in the production of hose-piping and of waterproof garments. A similar application is in the covering of insulated electric wires with rubber. Wires having a protective covering of regenerated cellulose may be impregnated with the compositions of the invention preparatory to the application of a further covering of rubber. Although the most generally convenient way of carrying out the invention is to impregnate the regenerated cellulosic materials with the composition and apply the impregnated material to the rubber stock preferably after decomposition of the viscose and coagulation of the rubber, the invention is not limited to this mode of operation but includes the application of the composition first to the rubber, the regenerated cellulosic material being subsequently attached by means of an adhesive, for example, casein, as well as the application of the composition simultaneously to the regenerated cellulose and the rubber.

The compositions used in carrying out the invention preferably contain rubber in the form of ammonia-stabilised natural latex. The invention however includes the use of other natural or artificial dispersions of rubber or rubber-like substances including dispersions made by the redispersion of natural rubber, similar dispersions having a basis of artificial rubber, aqueous dispersions of vulcanised rubber and of substances such as chlorinated rubber which can readily be united to vulcanised natural rubber.

Instead of sodium viscose other solutions of cellulose which are easily decomposable to regenerate cellulose by the action of heat or acid may be used provided their nature is such that their use does not involve substantial weakening of the materials which are to be joined. Solutions containing copper for instance are best avoided on account of the deleterious effect of this metal on rubber and the same applies to solutions containing oxidising agents such as perchlorates. Among other unstable compounds of cellulose which may be employed are xanthogenates of volatile bases, e. g. ammonia or strong organic bases. Decomposition with high concentrations of mineral acids is in general to be avoided.

The regenerated cellulosic material to which the rubber is to be attached may, as indicated above, be formed by the complete saponification of cellulose acetate especially cellulose acetate yarns which have been stretched considerably under the influence of steam or hot water. Regenerated cellulosic material obtained by other methods may however be used whether in the form of yarns, cords, fabrics, films, foils or in any other form. Thus the regenerated cellulose can be made by the saponification of other organic esters of cellulose, e. g. cellulose propionate or cellulose butyrate or from unstable solutions of cellulose such a viscose. The materials may comprise filaments or yarns of normal tenacity, e. g. 1–1.5 or 1.25 grams per denier or of high tenacity, e. g. 2–2.5 or 3 grams per denier or even higher, e. g. 4 or 5 grams per denier. Such high tenacity filaments and yarns can be made in the case of saponified dry spun cellulose ester materials by a stretching step such as is referred to above, effected before saponification using as a stretch-assisting agent an organic solvent e. g. in the case of cellulose acetate materials, acetone, dioxane or methylene ethylene ether in admixture with water or other suitable diluent, or steam or hot water. In the case of wet spun materials e. g. materials derived from viscose or from the saponification of wet spun cellulose ester materials, special methods of spinning can be used, for instance, methods involving stretching considerably during spinning.

Having described my invention, what I desire to secure by Letters Patent is:

1. Process for the production of tires, which comprises coating with a composition comprising a substantial amount of sodium viscose in aqueous solution in intimate admixture with rubber latex, tire cords in the unwoven state and comprising yarns of regenerated cellulose of tenacity at least 2 grams per denier, the coating composition being applied in direct contact with the regenerated cellulose of which the unwoven materials are composed, coagulating the rubber and regenerating the cellulose from the viscose by subjecting the coated cords to an acid bath, washing and drying the coated cords, embedding them in a suitably formed body of unvulcanised rubber containing vulcanising ingredients and heating the assembly so as to vulcanise the rubber with the cords in position.

2. Process for the production of yarns, cords and like unwoven materials of high tenacity, which comprises coating yarns, cords and like unwoven materials of regenerated cellulose having a tenacity of at least 2 grams per denier with a composition containing an aqueous dispersion of rubber in intimate admixture with an alkaline cellulose xanthogenate present in substantial amount in aqueous solution, the said composition being applied in direct contact with the regenerated cellulose of which the unwoven materials are composed, coagulating the dispersion and regenerating the cellulose from the unstable compound thereof, on the material, applying vulcanizable rubber to the treated materials and then subjecting the same to a vulcanizing treatment.

3. Process for the production of yarns, cords and like unwoven materials of high tenacity, which comprises coating yarns, cords and like unwoven materials of regenerated cellulose having a tenacity of at least 2 grams per denier with a composition comprising an aqueous solution of an alkaline cellulose xanthogenate present in substantial amount in intimate admixture with rubber latex, the said composition being applied in direct contact with the regenerated cellulose of which the unwoven materials are composed, coagulating the latex and regenerating the cellulose from the xanthogenate, on the material, applying vulcanizable rubber to the treated materials and then subjecting the same to a vulcanizing treatment.

4. Process for the production of yarns, cords and like unwoven materials of high tenacity, which comprises coating yarns, cords and like unwoven materials of regenerated cellulose having a tenacity of at least 2 grams per denier with a composition comprising an aqueous solution of sodium viscose present in substantial amount in intimate admixture with rubber latex, the said composition being applied in direct contact with the regenerated cellulose of which the unwoven materials are composed, coagulating the latex and regenerating the cellulose from the viscose, on the material, applying vulcanizable rubber to the treated materials and then subjecting the same to a vulcanizing treatment.

5. Process for the production of yarns, cords and like unwoven materials of high tenacity, which comprises coating yarns, cords and like unwoven materials of regenerated cellulose having a tenacity of at least 2 grams per denier with a composition containing an aqueous dispersion of rubber in intimate admixture with an alkaline cellulose xanthogenate present in substantial amount in aqueous solution, the said composition being applied in direct contact with the regenerated cellulose of which the unwoven materials are composed, coagulating the dispersion and regenerating the cellulose from the unstable compound thereof, on the material by the action of heat, applying vulcanizable rubber to the treated materials and then subjecting the same to a vulcanizing treatment.

6. Process for the production of yarns, cords and like unwoven materials of high tenacity, which comprises coating yarns, cords and like unwoven materials of regenerated cellulose having a tenacity of at least 2 grams per denier with a composition containing an aqueous dispersion of rubber in intimate admixture with an alkaline cellulose xanthogenate present in substantial amount in aqueous solution, the said composition being applied in direct contact with the regenerated cellulose of which the unwoven materials are composed, coagulating the dispersion and regenerating the cellulose from the unstable compound thereof, on the material by the action of an acid bath, applying vulcanizable rubber to the treated materials and then subjecting the same to a vulcanizing treatment.

7. Process for the production of tires, which comprises coating with an aqueous dispersion of rubber in intimate admixture with an alkaline cellulose xanthogenate present in substantial amount in aqueous solution, tire cords comprising yarns of regenerated cellulose of tenacity at least 2 grams per penier, the said composition being applied in direct contact with the regenerated cellulose of which the unwoven materials are composed, coagulating the rubber and regenerating the cellulose from the xanthogenate by subjecting the coated cords to an acid bath, washing and drying the coated cords, embedding them in a suitably formed body of unvulcanized rubber containing vulcanizing ingredients and heating the assembly so as to vulcanize the rubber with the cords in position.

8. Cords, yarns and like unwoven materials of regenerated cellulose of tenacity at least 2 grams per denier, said materials having a coating of rubber in intimate admixture with a substantial quantity of regenerated cellulose derived from an alkaline cellulose xanthogenate, said coating being in direct contact with the regenerated cellulose of which the unwoven materials are composed, and being united to a body of rubber by means of said mixture.

9. In a rubber tire, cords, yarns and like unwoven materials of regenerated cellulose of tenacity at least 2 grams per denier, said materials having a coating of rubber in intimate admixture with a substantial quantity of regenerated cellulose derived from an alkaline cellulose xanthogenate, said coating being in direct contact with the regenerated cellulose of which the unwoven materials are composed, and being united to a body of rubber by means of said mixture.

HENRY DREYFUS.